(12) United States Patent
Sanghavi et al.

(10) Patent No.: US 12,137,273 B2
(45) Date of Patent: *Nov. 5, 2024

(54) RENDERING A DYNAMIC ENDEMIC BANNER ON STREAMING PLATFORMS USING CONTENT RECOMMENDATION SYSTEMS AND ADVANCED BANNER PERSONALIZATION

(71) Applicant: Roku, Inc., San Jose, CA (US)

(72) Inventors: Mehul Sanghavi, San Jose, CA (US); Rohit Mahto, San Jose, CA (US); Kelly Lee, Fullerton, CA (US); Madhulika Taneja, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,814

(22) Filed: Oct. 26, 2023

(65) Prior Publication Data
US 2024/0064375 A1    Feb. 22, 2024

Related U.S. Application Data

(63) Continuation of application No. 17/889,975, filed on Aug. 17, 2022.

(51) Int. Cl.
*H04N 21/466* (2011.01)
*H04N 21/431* (2011.01)

(52) U.S. Cl.
CPC ..... *H04N 21/4668* (2013.01); *H04N 21/4316* (2013.01); *H04N 21/4667* (2013.01)

(58) Field of Classification Search
CPC .......... H04N 21/4668; H04N 21/4316; H04N 21/4667; H04N 21/812; H04N 21/2668; H04N 21/25891; H04N 21/252; H04N 21/4755
USPC ........................................................ 725/46
See application file for complete search history.

(56) References Cited

U.S. PATENT DOCUMENTS

| | | |
|---|---|---|
| 8,725,559 B1 | 5/2014 | Kothari et al. |
| 2003/0001846 A1 | 1/2003 | Davis et al. |
| 2009/0037279 A1 | 2/2009 | Chockalingam et al. |
| 2010/0088406 A1 | 4/2010 | Yu et al. |
| 2011/0082824 A1 | 4/2011 | Allison et al. |
| 2014/0195345 A1 | 7/2014 | Lyren |
| 2016/0007065 A1 | 1/2016 | Peles et al. |

(Continued)

*Primary Examiner* — Cynthia M Fogg
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for utilizing a content recommendation system powering a streaming media publisher channel, in conjunction with an object recognition model, to enhance dynamic generation of a banner being shown to a user via an awareness or performance campaign. This method allows the platform to present the most relevant ML personalized in-channel content to the publisher platform users in endemic banners that run on the platform which then correspondingly helps drive user reach. An example embodiment operates by implementing personalized content banners that may act as a hook for channel users opening their streaming device, both active and lapsed, to enter back into the channel.

20 Claims, 10 Drawing Sheets

(56) References Cited

U.S. PATENT DOCUMENTS

| | | |
|---|---|---|
| 2016/0092935 A1 | 3/2016 | Bradley et al. |
| 2016/0127783 A1 | 5/2016 | Garcia Navarro |
| 2022/0232282 A1* | 7/2022 | Ramirez .......... H04N 21/44218 |
| 2022/0309543 A1 | 9/2022 | Kushner et al. |
| 2022/0414754 A1 | 12/2022 | Afshar |

* cited by examiner

RENDERING A DYNAMIC ENDEMIC BANNER ON STREAMING PLATFORMS USING CONTENT RECOMMENDATION SYSTEMS AND ADVANCED BANNER PERSONALIZATION

CROSS-REFERENCE TO RELATED APPLICATIONS

This application is a continuation of U.S. patent application Ser. No. 17/889,975, filed on Aug. 17, 2022, the contents of which are incorporated herein by reference in its entirety.

BACKGROUND

Field

This disclosure is generally directed to creation of dynamic banners, and more particularly to recommendation systems providing content for personalized banners.

Background

Generally, serving ad content that is personalized to users is not new in the display advertising ecosystem. However, personalization of endemic media on Over-the-Top (OTT) devices has been difficult for several reasons. Endemic advertising works by placing, or allowing another business to place, advertising that appeals directly to the interests of customers. A cooking magazine, for example, makes an effective advertising outlet for companies that make kitchen knives or cookware. Ad media is typically run on awareness or performance optimization basis and in both cases, the targeting selected by the ad server or the user profile may not translate into an actual content experience for the user, but only a selection of the user for the campaign. The user may be chosen based on one or more targeting attributes that can include viewership data amongst hundreds of other possible signals. But all of that is used to isolate one of many eligible campaigns for the user to see. And within that campaign, the ad server chooses from one of a handful of pre-created creatives to send back to the user device. This approach does not solve the last mile problem of showing the best, most accurate content-based creative that the user is likely to take action on.

SUMMARY

Provided herein are system, apparatus, article of manufacture, method and/or computer program product embodiments, and/or combinations and sub-combinations thereof, for utilizing a content recommendation system powering a publisher channel in conjunction with a dynamically generated ad creative being shown to the user via awareness or performance campaigns. This method allows the platform to present the most relevant Machine Learning (ML) personalized in-channel content to the publisher platform users in endemic banners that run on the platform which then correspondingly helps drive user reach.

An example embodiment operates by implementing personalized content banners that may act as a hook for channel users opening their streaming device, both active and lapsed, to enter back into the channel.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for utilizing a content recommendation system powering a publisher channel in conjunction with a dynamically generated ad banner being shown to the user via awareness or performance campaigns. In some embodiments, the system virtually generates many different variations and combinations of the same media, related media content, media titles, media formats, and media imagery, for hundreds of targeted users such that each banner is custom tailored to that individual beyond the off-the-shelf assets available to the content recommendation system.

Figure 1:
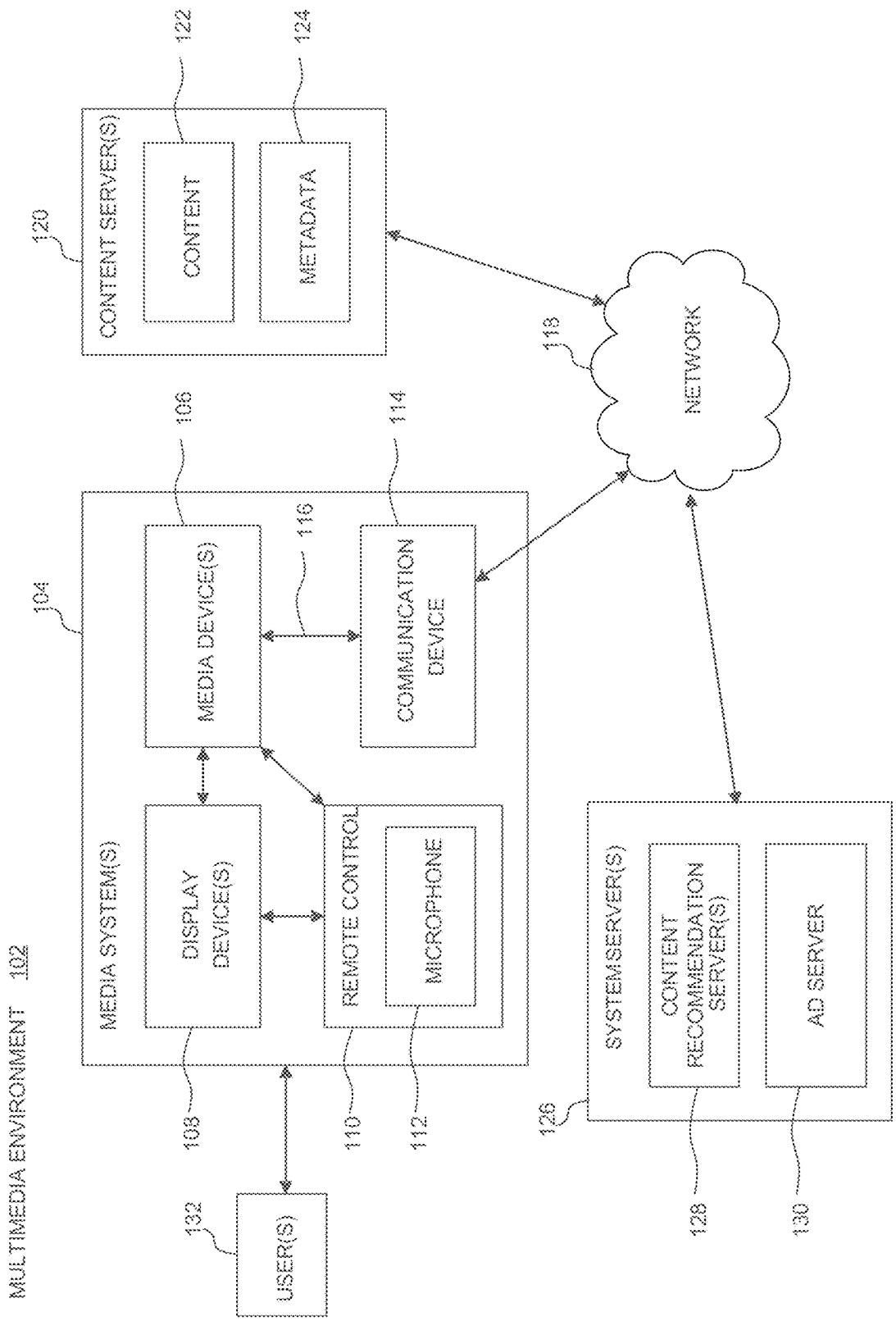
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to advertising embodiments and, thus, the system servers 126 may include one or more advertising servers 130. In some embodiments, the media device 106 may display advertisements in the media system 104, such as on the display device 108.

In addition, using information received from the media devices 106 in the thousands and millions of media systems 104, content recommendation server(s) 128 may identify viewing habits, for example, preferences or likes for different users 132 watching a particular movie. Based on such information, the content recommendation server(s) 128 may determine that users with similar watching habits may be interested in watching similar content.

The system servers 126 may also include an audio server (not shown). In some embodiments, the audio data received by the microphone 112 in the remote control 110 is transferred to the media device 106, which is then forwarded to the system servers 126 to process and analyze the received audio data to recognize the user 132's verbal command. The system servers 126 may then forward the verbal command back to the media device 106 for processing.

Figure 2:
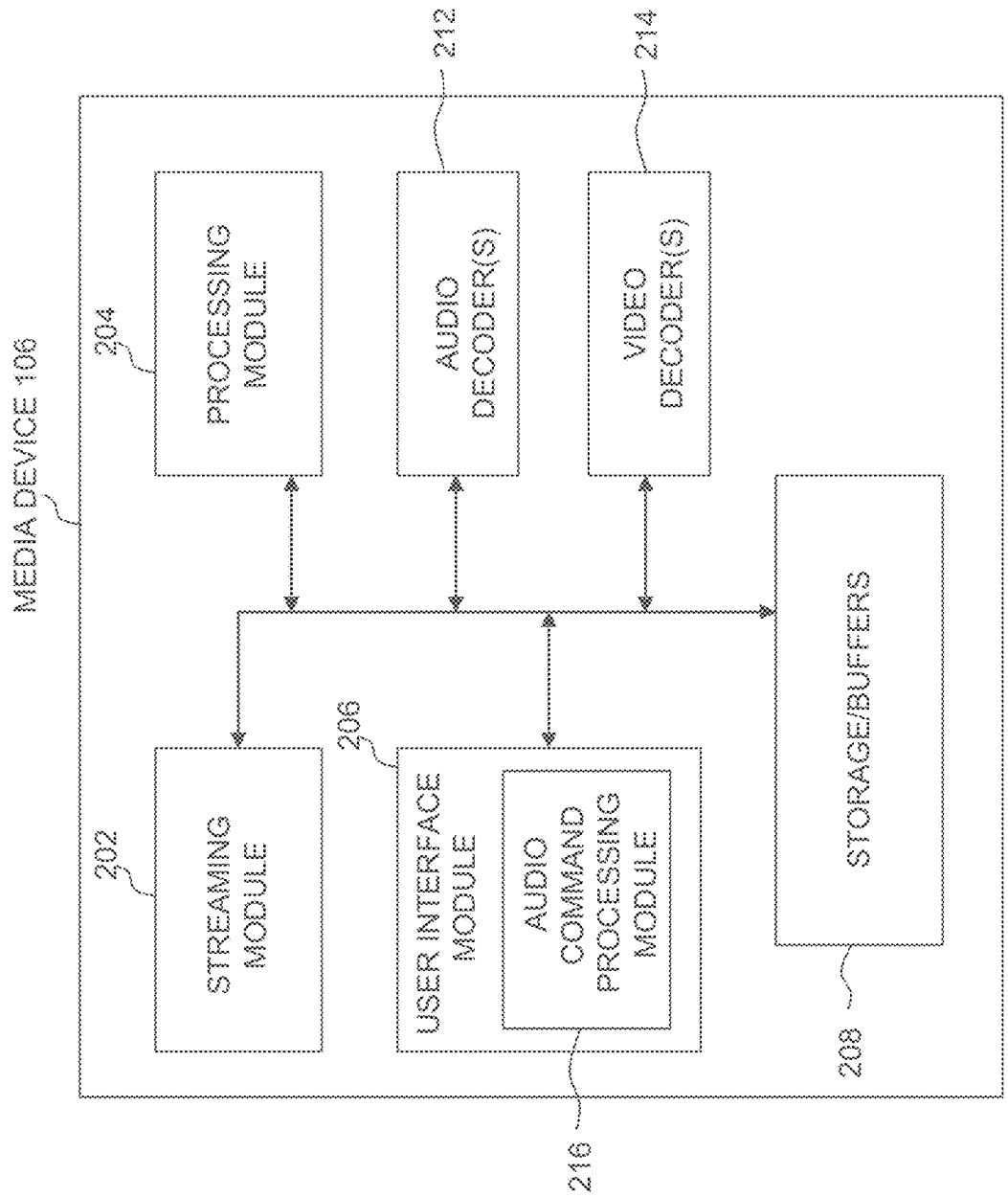
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XICAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Personalized Banners Based on Content Recommendation Services

Referring to FIG. 1, the media devices 106 may exist in thousands or millions of media systems 104. Accordingly, the media devices 106 may lend themselves to ad content solution embodiments. In some embodiments, an over-the-top (OTT) media device or service may benefit from the embodiments disclosed herein. An over-the-top (OTT) media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVoD) services that offer access to film and television content (including existing series acquired from other producers, as well as original content produced specifically for the service).

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

In various embodiments, the technology described herein implements a system, apparatus, article of manufacture, method and/or computer program product embodiments, and/or combinations and sub-combinations thereof, for utilizing a content recommendation system (RecSys) powering a publisher channel in conjunction with a dynamically generated ad banner being shown to the user via awareness or performance campaigns. This method allows the platform to present the most relevant ML personalized in-channel content to the publisher platform users in endemic banners that run on the platform which then correspondingly helps drive user reach.

A content recommender system, or a content recommendation system, is a subclass of information filtering system that seeks to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Content recommendation systems are used in a variety of areas, with commonly recognized examples taking the form of playlist generators for movies, series, documentaries, podcasts, music services, and product recommendations, to name a few. In some embodiments, the playlist may be instantiated as a series of visual tiles displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommender systems that has wide use is collaborative filtering. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself. Many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to like the item.

Content-based recommender systems can also include opinion-based recommender systems. In some cases, users are allowed to leave movie reviews or feedback on the items. Features extracted from the user-generated reviews may improve meta-data of content items. Sentiments extracted from the reviews can be seen as users' rating scores on the corresponding features. Common approaches of opinion-based recommender systems utilize various techniques including machine learning, content recognition, facial recognition, sentiment analysis and deep learning as discussed in greater detail hereafter.

FIGS. 3-6 illustrate a few non-limiting examples of dynamically created ad personalized banners for an OTT system. These examples should not limit the scope of the technology described herein as they are limited to high level example illustrations of one or more parts of the overall system and processes.

Figure 3:
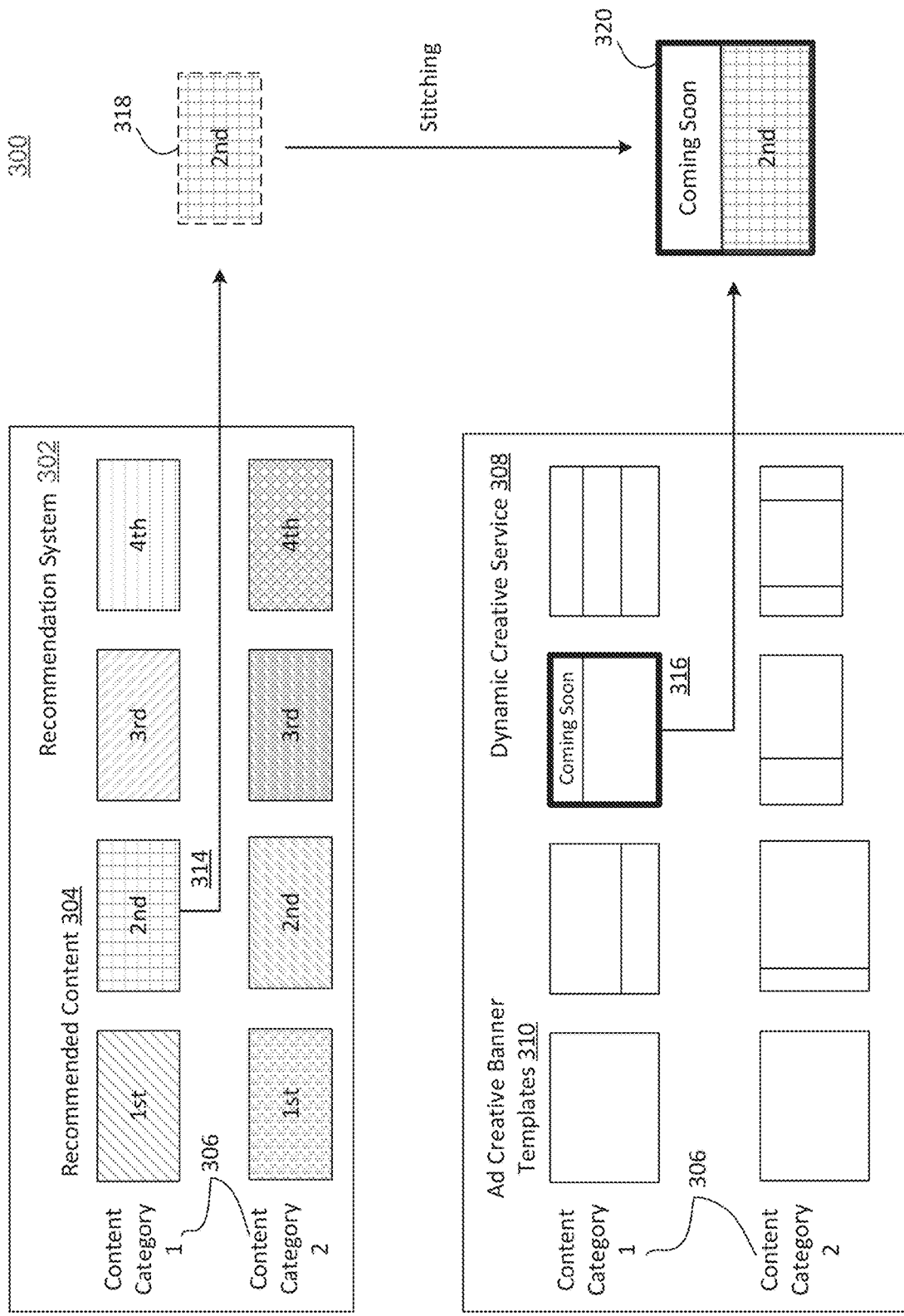
FIG. 3 illustrates an example diagram of a personalized banner system, according to some embodiments.

FIG. 3 illustrates an example diagram of a personalized banner system 300, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

Personalized banner system 300 may be implemented with a recommendation system 302. Recommendation system 302 may be configured with content recommendation server 128. Alternatively, or in addition to, one or more components of the recommendation system 302 may be implemented within the media system 104, by third party platforms, a cloud-based system or distributed across multiple computer-based systems. As shown, personalized banner system 300 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. As shown, dynamic creative service 308 may be configured with a plurality of possible advertising banner samples. Advertising banner samples may be templates 310 directed to specific advertising strategies and include differing sizes, colors, fonts, messaging, backgrounds and locations to add recommendation specific content. For example, based on meeting specific Key Productivity Indicators (KPIs), an art, design, marketing or advertising department within a company may create creative work such as advertising art work that will produce an expected user action responsive to the specific ad banner. For example, to grow an audience for a new series, the creative team may generate a banner ad with the hook "hot new series".

Building on the above "new series" example, in an exemplary embodiment, the recommendation system would generate a content category 1 of a plurality of content categories 306 of recommended content 304 of new shows and order them (shown as tiles 1-4, etc.) based on viewership, expected viewership, desired viewership, to name a few. The personalized banner system 300 would then implement a two pronged approach of identifying KPIs and related advertising campaigns as well as identifying related content that would complement or improve these campaigns. As shown, a creative banner 316 is selected from the same content category (1) to introduce a new series that is coming soon to the streaming service or platform. Content 314 that is recommended in a matching category would be selected 318, resized (as needed) and stitched into the ad banner template 316. The composite banner 320 result marries the benefits of a crafted ad campaign to the intelligence of the recommendation system 302 and provides a technical improvement of advanced banner personalization or customization to the banner creation process not previously provided.

Figure 4:
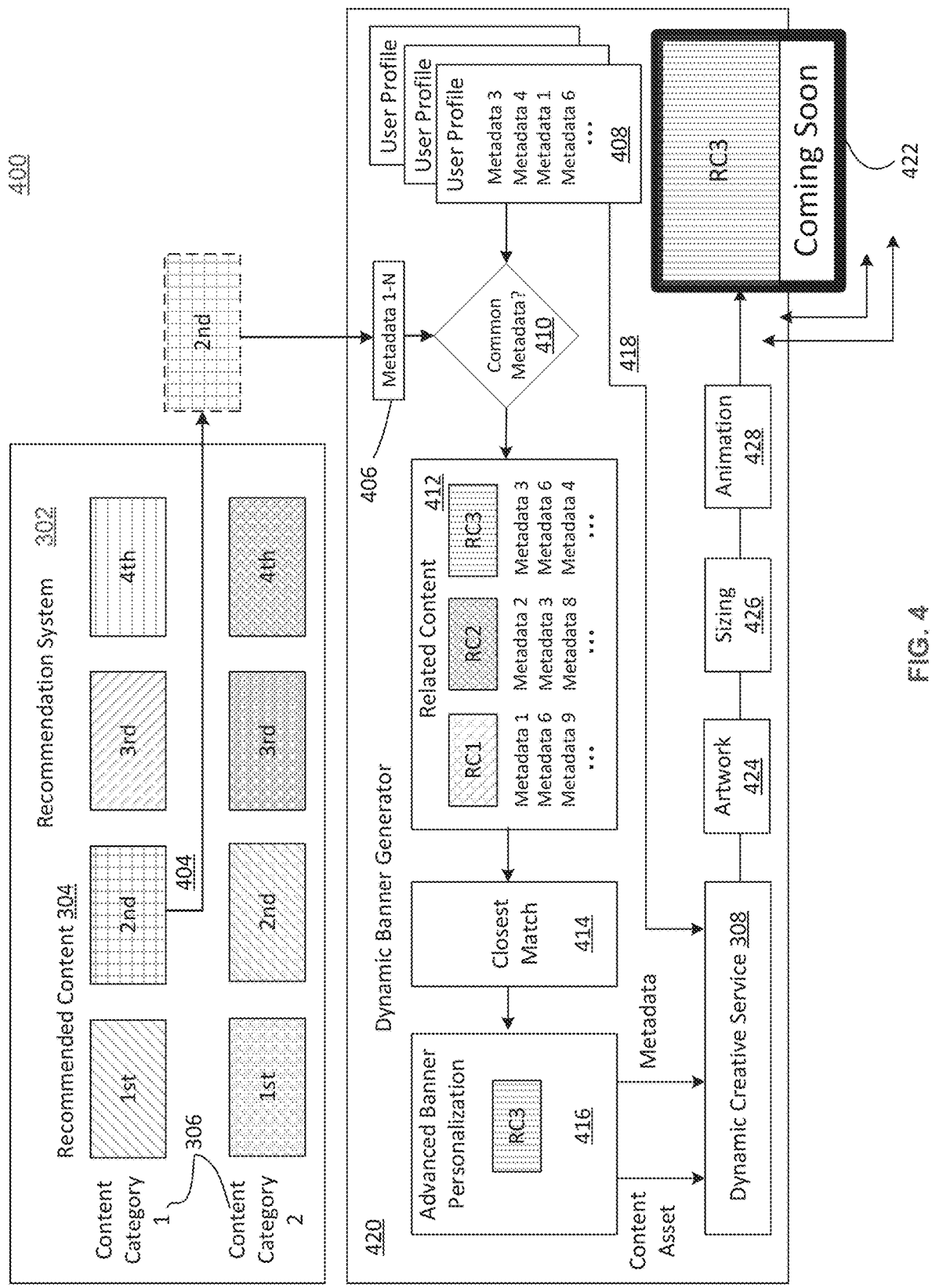
FIG. 4 illustrates another example diagram of a personalized banner system, according to some embodiments.

FIG. 4 illustrates another example diagram of a personalized banner system 400, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

Personalized banner system 400 may be implemented with a recommendation system 302 and dynamic creative service 308. Recommendation system 302 may be configured with content recommendation server 128. Alternatively, or in addition to, one or more components of the recommendation system 302 and dynamic creative service 308 may be implemented within the media system 104, by third party platforms, a cloud-based system or distributed across multiple computer-based systems. Dynamic banner generator 420 is illustrated as including various elements to assist in generating a dynamic banner. However, the dynamic banner generator 420 is not limited to these elements and, in some embodiments, may additionally include metadata processing (e.g., 406 and 410, et al.), graphics processing (e.g., image framing, color changes, fonts, composite filling, sizing, scaling, etc.) or artwork manipulation processing 424 (e.g., extracting of part of an image from a larger image, relocating or combining with other artwork, etc.). In some embodiments, the dynamic banner generator may be integrated within the dynamic creative service 308.

For a same recommended content 304, the personalized banner system 400 may generate a plurality of different banner combinations. The selected recommended content 404 may include identifying metadata 406 of the content, but may not limit what can be represented by the banner artwork. For example, an output of recommended content may be "TV Show A". In some embodiments, system architecture may assume that there is one or two primary content assets that can be retrieved from the recommendation system 302 (backend). But, by reviewing metadata from a user's profile 402, and comparing to recommended content identifying metadata 406 of selected recommended content 404 asset, the system may determine, for common metadata 410, if he/she has an affinity towards one or more cast/characters of the show and fetch a different, but related, asset. Alternatively, or in addition to, there may be specific scenes from the media that can be cut up into artwork and stitched into the banner. Alternatively, or in addition to, there could be nostalgic elements (specific show artwork from specific seasons) that can be brought to surface. Featuring specific characters, which a user may have shown an affinity towards in the artwork, will create an immediate affinity for them leading to higher selection rates. With studios focusing on more creative content via original programming, there may be an increasing emphasis on generating artwork for supporting cast or characters that can generate their own fan following for the show. While described for metadata identifying cast, characters, scenes and nostalgic elements, any identifying metadata may be utilized during the comparing process to dynamically generate a personalized banner without departing from the scope of the technology described herein.

As will be described in greater detail in FIGS. 4-9, the ad template can also extend beyond the pre-set template layout combinations as shown in FIG. 3. In some embodiments, dynamic banner generator 420 can vary artwork elements 424. For example, artwork may be modified by position within the banner, colors, fonts, sizing, framing, text, recommended content assets, related content assets, parts of these content assets, etc. In a non-limiting example, related content 412 may retrieved from the recommendation system or from another content source, such as content server 120, by a call for content assets similar to the common metadata 410. Metadata of the retrieved related content (shown as RC1-RC3) may be further compared by finding a closest match 414 to the common metadata 410. In the example shown, RC3 includes both "metadata 3" and "metadata 4" from user profile 408 and is selected as related content providing a closest match. Closest may be defined as having one or more identical metadata or having one or more similar metadata. Similar metadata may include, but is not limited similar genre, characters, actors, additional actors in an ensemble, etc. A selected content asset 404 or 412, or both may be forwarded to the dynamic creative service 308.

In some embodiments, one or more banner components may be animated 428. In a non-limiting example, the visual elements are converted to show motion, such as a parallax effect, or introducing elegant cinemograph type motion to make the asset look alive. Parallax, is an apparent displacement or the difference in apparent direction of an object as seen from two different viewpoints. Cinemagraphs are still photographs in which a minor and repeated movement occurs, forming a video clip. They are commonly published as an animated GIF or in other video formats, and can give the illusion that the viewer is watching an animation.

In some embodiments, the dynamic banner generator 420 may modify banner presentations by sizing, scaling or cropping 426 (illustrated as sizing for brevity). In a non-limiting example, based on meeting specific KPIs, an art, design, marketing or advertising department within a company may create creative work such as advertising art work that will produce an expected user action responsive to the specific ad banner. For example, to grow an audience for a higher rated movie, the creative team may generate a banner ad with the hook "97% rating" or similar phrasing that suggests the movie is rated "highly" by others.

Building on the above highly rated movie example, in some embodiments, the recommendation system would generate a content category 1-N (306) of highly rated movies and order them (shown as tiles 1-4, etc.) based on ratings. The personalized banner system 400 would then implement a two pronged approach of identifying KPIs and related advertising campaigns as well as identifying related content that would complement or improve these campaigns. As shown, a dynamically generated creative banner 422 is generated a personized banner to introduce a highly rated movie coming soon on the streaming service or platform. Content 404 that is recommended in the same category or related content 412 or both would be selected, sized and stitched into the ad banner template to form a composite ad banner 422.

In some embodiments, metadata 418 from a user's profile may lead to specific artwork or banner adjustments. In a first non-limiting example, if the user has vision related needs (e.g., degenerative eyesight, color blindness, etc.), as reflected by one or more user profile metadata, the artwork or banner itself can be resized or specific colors chosen to accommodate the noted impairment or preference. As shown, dynamically generated creative banner 422 may be enlarged to accommodate a user's vision needs. While illustrated with a banner enlargement, any component of the banner may be modified. In various non-limiting embodiments, the following components may be dynamically modified: size, image cropping, aspect ratio of images or the banner, colors, fonts, graphical shading, composite fill, framing, etc. In the above non-limiting example, metadata 418 from the user profile 408 may initiate the modification. However, the dynamic banner generator 420 may initiate any component change based on any known component metadata without departing from the scope of the technology disclosed herein. For example, if a specific character is a user's favorite character, an image of this character may be enlarged or highlighted to draw attention to this noted affinity. Alternatively, or in addition to, metadata may be used as filter during dynamic banner generation. For example, users susceptible to seizures may have any motion or blinking aspects disabled from their banners. In another example, user profiles 408 with a negative affinity to violence may exclude images with metadata reflecting violence or a specific rating, such as "R" rated.

In some embodiments, audio, visual or user-directed signaling may be checked to determine if other users may be present in the room. If the media device has user profiles for each of those users, then the user profile input 408 may be a combination of multiple user profiles. This may play a big role in content selection, especially if there is a child in the room, etc.

Figure 5:
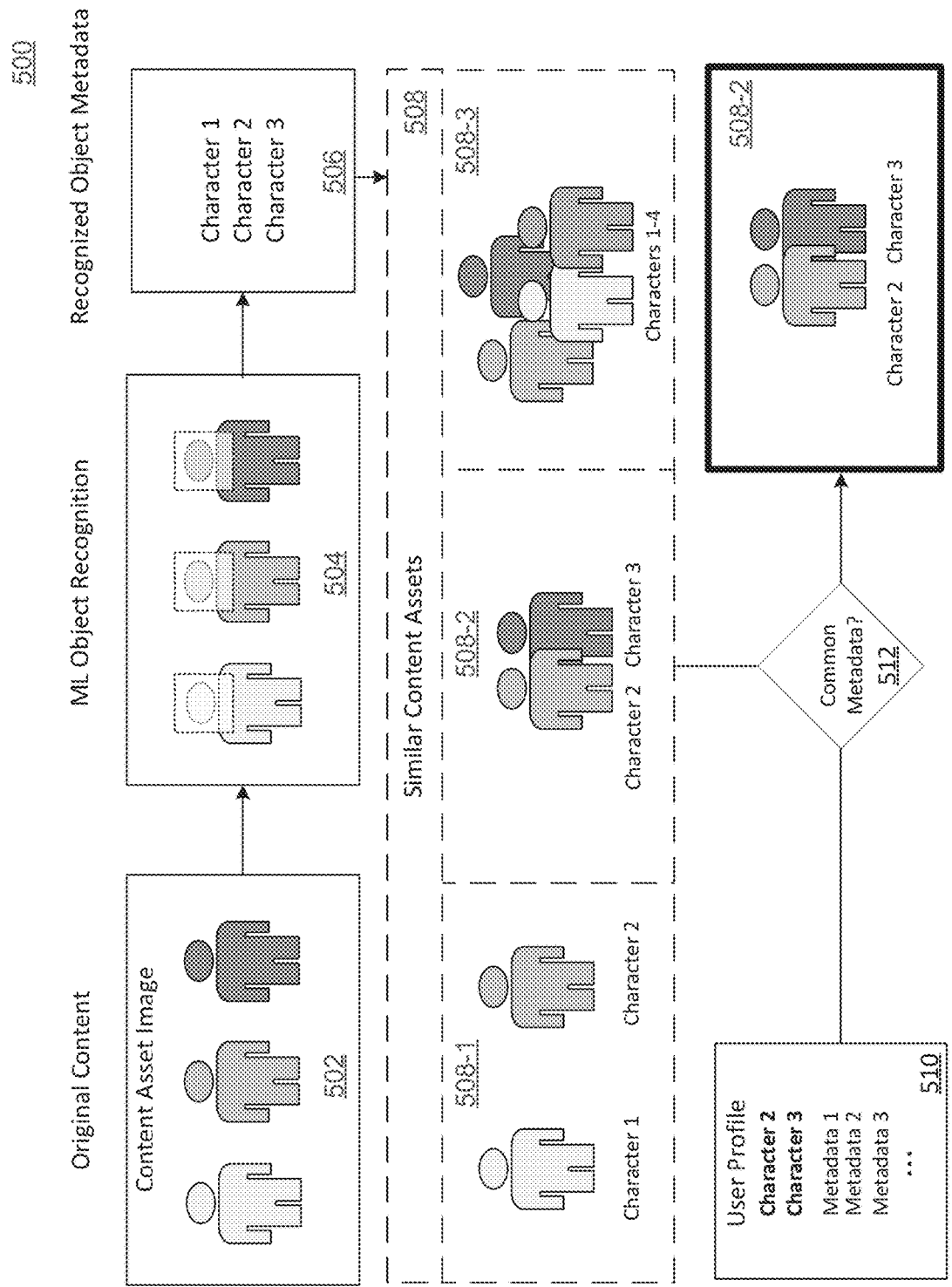
FIG. 5 illustrates another example diagram of a personalized banner system, according to some embodiments.

FIG. 5 illustrates another example diagram of a personalized banner system 500, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Figure 6:
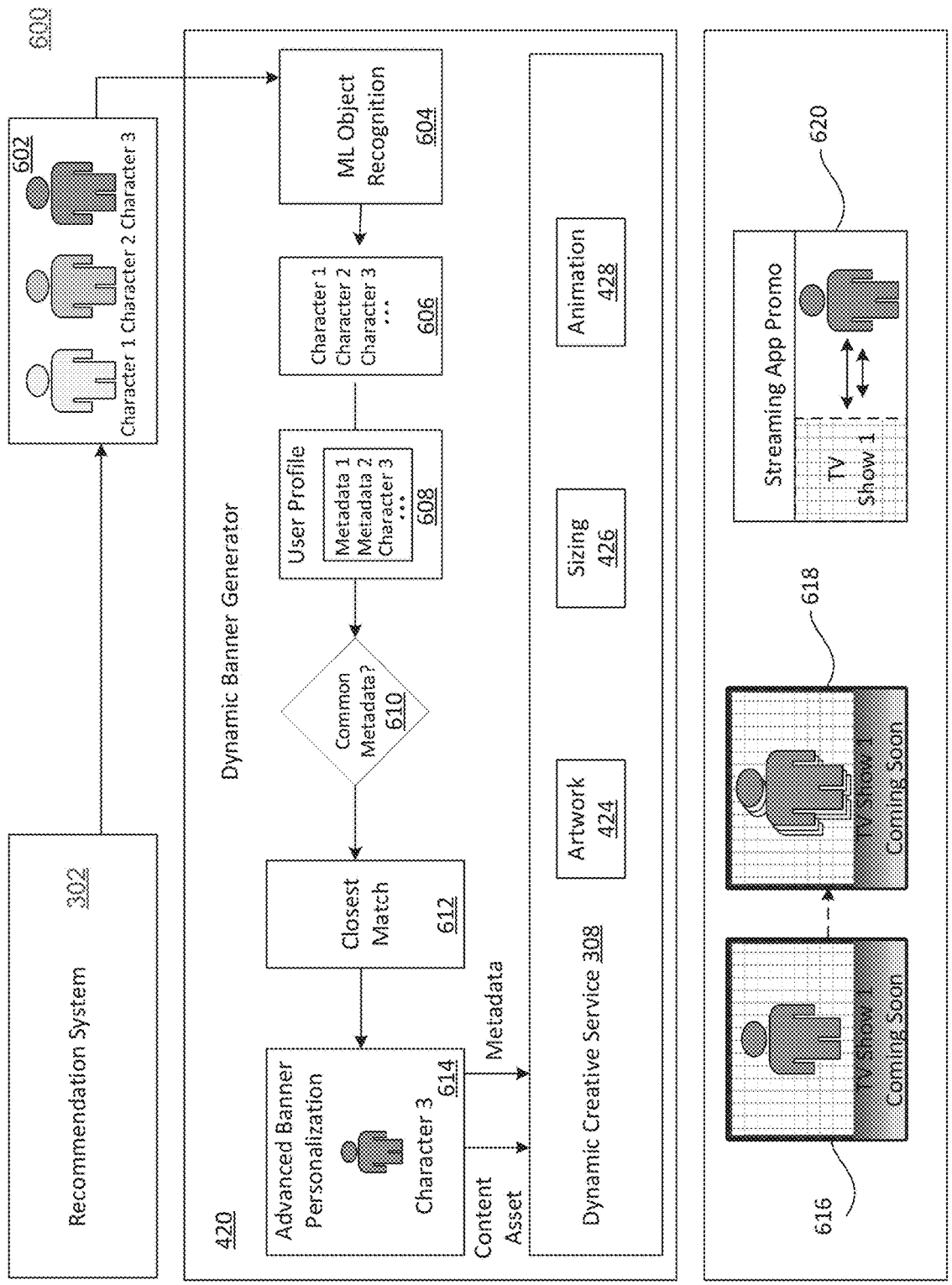
FIG. 6 illustrates a block diagram of a personalized banner system, according to some embodiments.

Personalized banner system 500 may be implemented with a recommendation system 302 and dynamic creative service 308. Recommendation system 302 may be configured with content recommendation server 128. Alternatively, or in addition to, one or more components of the recommendation system 302 and dynamic creative service 308 may be implemented within the media system 104, by third party platforms, a cloud-based system or distributed across multiple computer-based systems. While shown for implementing ML object recognition to assist recommendation system 302 in selecting recommended content to advance to the dynamic banner generator 420, the dynamic banner generator 420 or dynamic creative service may implement the technology described herein as shown in FIG. 6.

Original content, such as a movie or TV show, has associated with it, imagery such as a content asset image 502, such as a promo. In addition, the original content may also be linked with related imagery, such as imagery corresponding to a specific season, episode, character, actor, ensemble, etc.

As will be described in greater detail in FIG. 8 (e.g., object recognition model 818), the recommendation system will generate recommendations for user X by training a ML object recognition model 818 with examples of image-to-object matches that may be extracted and recognized. Objects may include, but are not limited to, characters, actors, genres, themes, media series, text (e.g., titles), etc. As shown, the object recognition model will analyze the imagery 504 from the content asset imagery and recognize one or more content objects. These objects may be identified by their known metadata (e.g., actor's name or character) 506.

In some embodiments, the recommendation system 302 may optionally expand the available content for recommendation to a user by extracting similar content assets with one or more common or similar metadata. In a non-limiting example, if "TV Show A" has three characters, the recommendation system may search for and locate similar content assets 508 that retain at least one of the identified objects (shown as characters 1, 2 or 3). A first similar content asset 508-1 may include characters 1 and 2, a second similar content asset may include characters 2 and 3 and a third similar content asset 508-3 may include characters 1-4.

The recognized object metadata 506 or the metadata of optional similar content assets 508 may have common metadata 512 with one or more of metadata from a use profile 510. Using a closest match, where close is defined as having one or more identical metadata or one or more similar metadata, a content asset may be chosen as a recommendation and be forwarded to the dynamic banner generator 420 or dynamic creative service 308. In this example, similar content asset 508-2 includes common metadata "character 2" and "character 3" and therefore represents an advanced banner personalization recommendation for that user. An exact match of metadata is not required for a closest match, as at least one similar metadata can produce an advanced banner personalization recommendation. For example, "character 3" may be played by "Actor B", and a match to other content assets that Actor B is included in may be used as a closest match. A closest match may be determined by simple ordering, where a user's first (or most frequently selected) metadata choice is selected when available in a related content asset. When multiple metadata matches are available, the system may select a related content asset by a second, third, or other number of common metadata (e.g., frequency of common metadata). Alternatively, or in addition to, a closest match selector algorithm may include a weighted formulation (variable weighting) where some metadata are better indicators of a user's likes/dislikes and therefore may be more heavily weighted. For example, metadata reflecting genre may be weighted more heavily. Other known similarity algorithms, such as, but not limited to, ML, fuzzy logic, neural networks, etc., may be substituted without departing from the scope of the technology disclosed herein. While described for specific characters, any known content object may be identified and used to personalize the recommendation feed to the dynamic banner generator.

FIG. 6 illustrates another example diagram of a personalized banner system 600, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

Personalized banner system 600 may be implemented with a recommendation system 302. Recommendation system 302 may be configured with content recommendation server 128. Alternatively, or in addition to, one or more components of the recommendation system 302 may be implemented within the media system 104, by third party platforms, a cloud-based system or distributed across multiple computer-based systems. As shown, personalized banner system 600 may be implemented with a dynamic banner generator 420 and dynamic creative service 308. Dynamic banner generator 420 is illustrated as including various elements to assist in generating a dynamic banner. However, the dynamic banner generator 420 is not limited to these elements and, in some embodiments, may include additional metadata processing (e.g., multiple levels of metadata comparisons, filters, historical comparisons, time period comparisons, similar user comparisons, etc.), graphics processing as well as artwork manipulation processing. In some embodiments, the dynamic banner generator may be integrated within the dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. As shown, dynamic creative service 308 may be configured with a plurality of possible advertising banner samples (templates) 310. For example, based on meeting specific KPIs, an art, design, marketing or advertising department within a company may create creative work such as advertising art work that will produce an expected user action responsive to the specific ad banner. For example, to grow an audience for a streaming service or content provider, the creative team may generate a banner ad with the hook encouraging users to download the streaming app and may even offer a promo cost or time based incentive, like "first three months free", et al.

In the embodiment shown in FIG. 6, the machine learning object recognition system described in FIG. 5 may be implemented by, or alternatively, operative with the dynamic banner generator 420 to identify objects present in a recommended content asset. Recommendation system 302 may output a recommended content asset 602, such as a promo image including multiple characters of an upcoming series. The recommendation system 302 may use any recommendation method, such as, but not limited to those described in herein. As shown in the example, ML, Object Recognition 604 identifies, in the recommended content 602, various objects and their associated identifying metadata 606. In the example, shown, the identification includes a plurality of characters 606, such as "character 1", "character 2", "character 3", in "TV Show 1". A user profile 608 may contain one or more metadata reflecting a user's interests, preferences and filters. In a non-limiting example, a user's interests may include media types (movies, music, TV shows, etc.), genres, content affinities, etc. Preferences may include, but are not limited to, specific actors, characters, themes, etc. Filters may include, but are not limited to, limiting content based on ratings, violence, specific subject matter, etc.

In 610, a comparison is made of recommended content asset metadata 606 with metadata from the user's profile 608. User profile 608 may contain a plurality of metadata that may match one or more of metadata 606 associated with each of the identified objects in recommended content asset 602. Using a closest match 612, as previously described, a content asset may be chosen from recommended content asset 602 to provide an advanced banner personalization of the banner. For example, the user has an affinity to "character 3" as shown in their User Profile 608. A selection of only this character from the group of characters originally shown in recommended content asset 602 generates an advanced banner personalization content selection 614 not provided by prior systems.

In some embodiments, Dynamic Creative Service 308 may include artwork 424, such as graphics, background imagery, framing, composite filling, colors, etc. Optionally, a call may be made to a source of additional instances of artwork (e.g., content recommendation server or content server 120 or third party sources) to augment a dynamically generated banner 616, 618 or 620. Dynamic Creative Service 308 may include sizing functionality 426 to chop content selections into smaller resizable segments. Sizing may include resizing or scaling of any component of the recommended content asset 602 or selected content assets of the advanced banner personalized content assets. In some embodiments, Dynamic Creative Service 308 may include animation 428, such as converting the visual elements to show motion 618, such as a parallax effect, or introducing elegant cinemograph type motion 620 to make the asset look alive. They are commonly published as an animated GIF or in other video formats, and can give the illusion that the viewer is watching an animation.

As shown, a creative banner, such as example banners 616, 618 or 620, is selected to introduce a popular TV show available on the streaming service or platform. The selected content and any selected graphics are sized and stitched into the ad banner to form a composite ad banner. Example banner 616 illustrates a stitched background and "character 3" enlarged for prominent display to a user with a known affinity to the same or a similar character. Example banner 618 illustrates movement or animation of "character 3". Example banner 620 illustrates generating relative motion between two visual components of the banner.

While described in FIGS. 3-6 for specific digital content ad banners, any advertising campaign product or promotion may be substituted without departing from the scope of the technology described herein. In addition, the banners may have more or less sections, be of varying sizes, colors, patterns, backgrounds and be displayed at one or more locations within media system 104.

Figure 7:
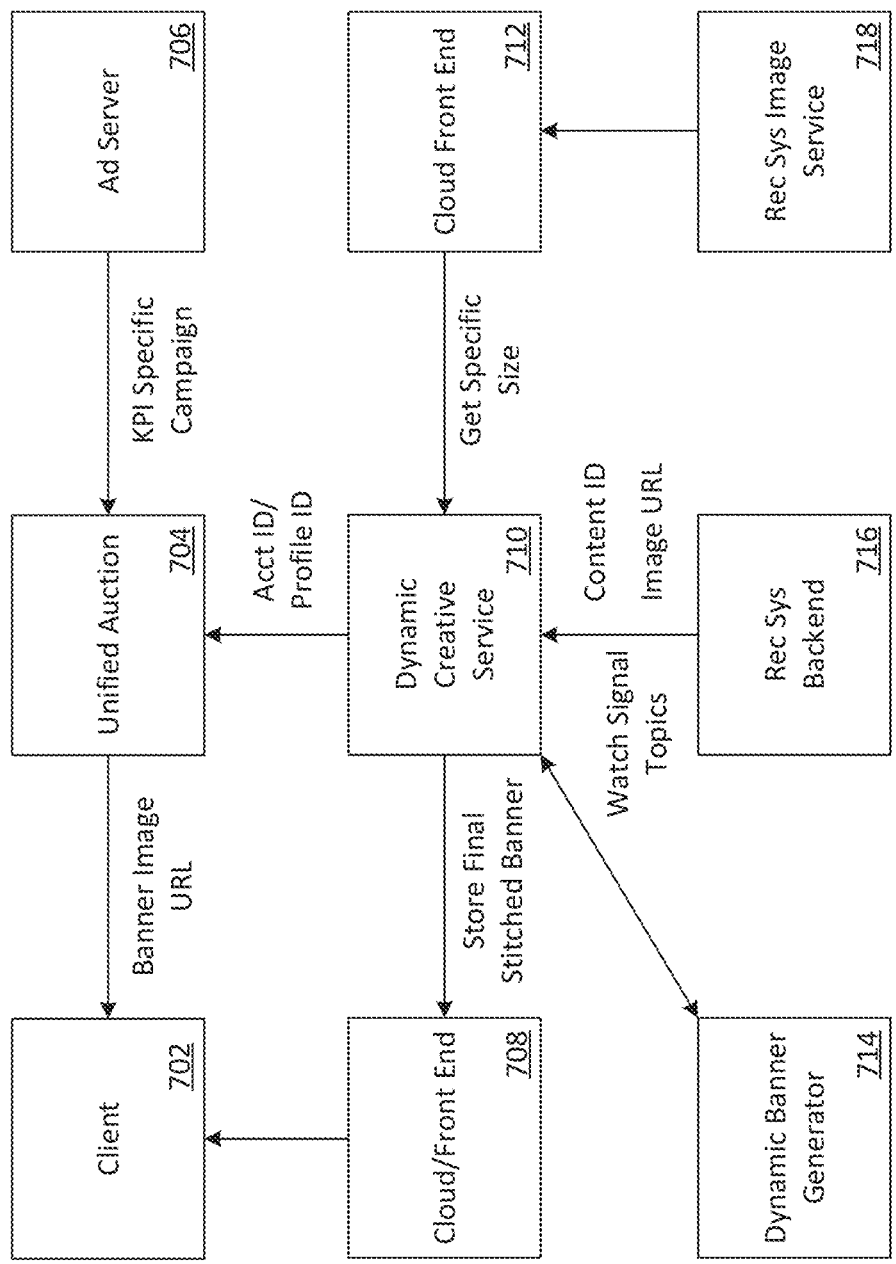
FIG. 7 illustrates another block diagram of a personalized banner system, according to some embodiments.

FIG. 7 illustrates a block diagram of a personalized banner system 700, according to some embodiments. System components described may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the processes performed on the components may be performed simultaneously, or in a different order than described for FIG. 7, as will be understood by a person of ordinary skill in the art.

Ad server 706 may be configured as a service that places advertisements on digital platforms. For example, ad serving technology companies provide advertisers a platform to serve ads, count them, choose the ads that will make the most money, and monitor the progress of different advertising campaigns. An ad server may be implemented as a Web server (e.g., ad server 130) that stores advertising content used in online marketing and delivers that content onto various digital platforms such as television, streaming devices, smartphones, tablets, laptops, etc. An ad server may be configured to store the advertising material and distribute that material into appropriate advertising slots. One purpose of an ad server is to deliver ads to users, to manage the advertising space, and, in the case of third-party ad servers, to provide an independent counting and tracking system for advertisers/marketers. Ad servers may also act as a system in which advertisers can count clicks/impressions in order to generate reports, which helps to determine the return on investment for an advertisement on a particular media streaming platform. Ad server may advance KPI specific campaigns to Unified Auction 604.

Unified auction 704 brings together a plurality of possible ad campaigns meeting various KPIs for selection. In one non-limiting example, pay-per-click (PPC) is an internet advertising model used to drive traffic to content streaming platforms, in which an advertiser pays a publisher when the ad is clicked (i.e., selected). Advertisers typically bid, in a unified auction 704, on content or keywords relevant to their target market and pay when ads are clicked. Alternatively, or in addition to, content sites may charge a fixed price per click rather than use a bidding system. PPC display advertisements, also known as banner ads, are shown on streaming platforms with related content that have agreed to show ads and are typically not pay-per-click advertising, but instead usually charge on a cost per thousand impressions (CPM). The amount advertisers pay depends on the publisher may be driven by two major factors: quality of the ad, and the maximum bid the advertiser is willing to pay per click measured against its competitors' bids. In general, the higher the quality of the ad, the lower the cost per click is charged and vice versa.

Recommendation system (RecSys backend) 716 (same as 302) may be configured with content recommendation server 128. Alternatively, or in addition to, one or more components of the recommendation system 716 may be implemented within the media system 104, by third party platforms, a cloud-based system or distributed across multiple computer-based systems. Recommendation system 716 may be configured to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

An image stitcher may be implemented in the client 702 or be implemented in the dynamic creative service 710 or dynamic banner generator 714. The image stitcher is configured to visually combine one or more content recommendation representations (e.g., image, video, text, etc.) into a selected ad banner. The image stitcher may resize, change one or more colors, or add or remove one or more segments to the content representation while integrating it into a banner template (See FIGS. 3-6).

In some embodiments, the client 702, for example, media system 104, may pull or call the completed stitched banner to be displayed on the client device (e.g., display device 108). For example, the banner may be displayed on a same graphics window that renders a plurality of streaming channels. The streaming channels may, in one approach, be arranged as a series of content tiles and ordered or not ordered. For example, a series of streaming channels may be organized by genre and display a series of tiles in a descending order of popularity. The stitched banner may be prominently displayed to attract the attention of the user to a specific available content selection on one or more of the channels.

Dynamic Creative Service 710 generates a plurality of creatives (e.g., banner templates) in an attempt to meet the various KPI specific ad campaigns generated by ad server 706. As shown in FIGS. 3-6, the dynamic creative service 710 receives recommended content from the recommendation system 716 based on watch signal topics (e.g., genre, new movies, trending series, etc.). In some embodiments, the recommended content is identified by a content ID (e.g., title) and an image URL (uniform resource locator) as a link to the image. The dynamic creative service 710 communicates an account number and profile ID to the unified auction.

The one or more content recommendation representations may be retrieved using an Image URL from a recommendation system image service 718 through a cloud front end 712 to resize or otherwise edit for subsequent stitching operations. For example, image stitcher may need to resize the content image, change one or more colors, or add or remove one or more segments to the content representation while integrating it into a banner template (See FIGS. 3-6). Completed stitched banners are stored in cloud/front end 708 (e.g., DB).

Figure 8:
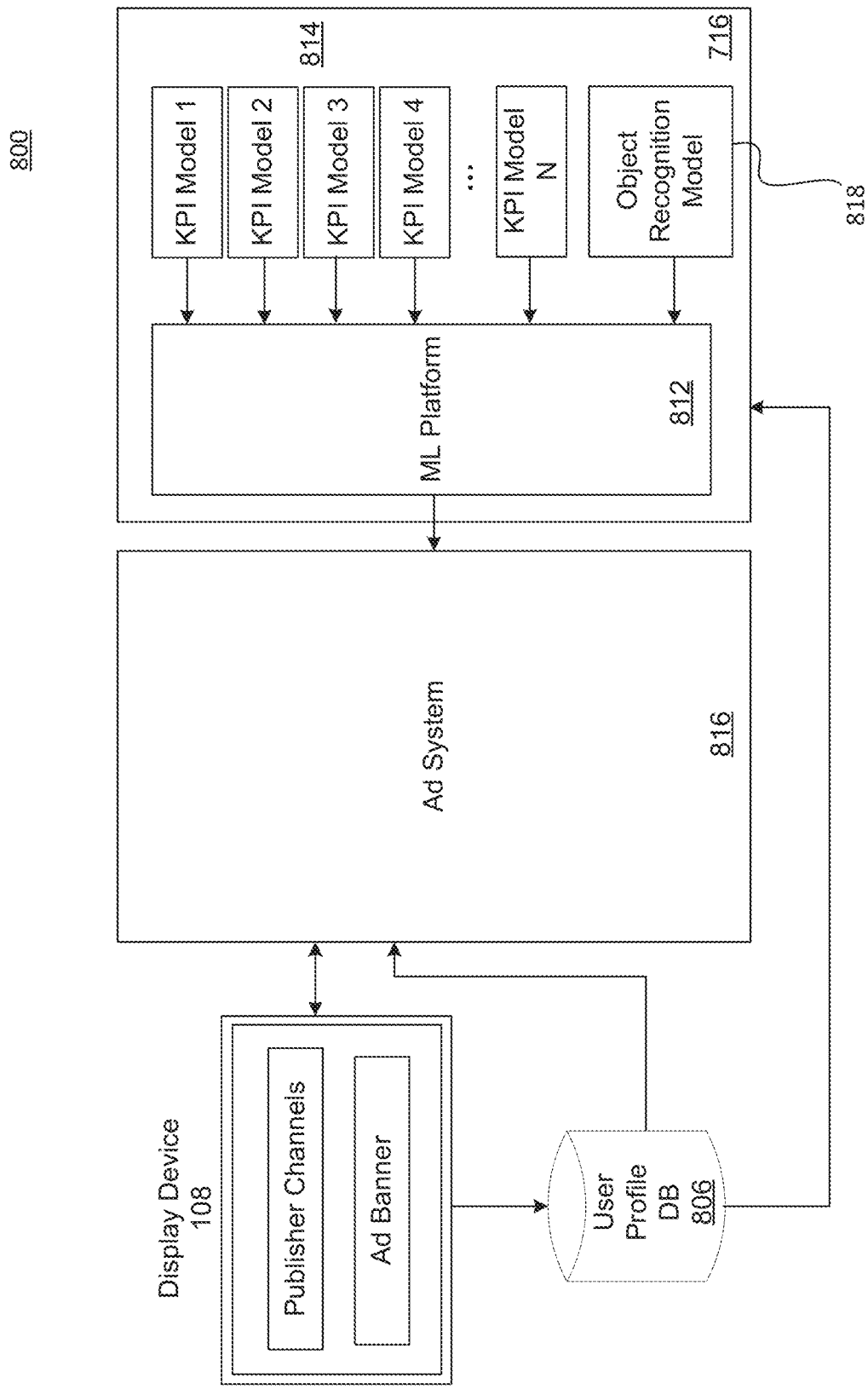
FIG. 8 illustrates another block diagram of a personalized banner system, according to some embodiments.

FIG. 8 illustrates another example diagram of a personalized banner system 800, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art.

Recommendation System Backend 716 may be implemented with a machine learning platform 812. Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine learning engine may use various classifiers to map concepts associated with a specific content structure to capture relationships between concepts (e.g., watch signal topics) and the content. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify content watch patterns and associated future content selections within varying content structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of content recognition, a dataset of movies and genre matches may be used.

In some embodiments, machine learning models are trained with other customer's historical information (e.g., watch history). In addition, large training sets of the other customer's historical information may be used to normalize prediction data (e.g., not skewed by a single or few occurrences of a data artifact). Thereafter, the predictive models may classify a specific user's historic watch data based on positive (e.g., movie selections, frequency of watching, etc.) or negative labels (e.g., no longer watching, etc.) against the trained predictive model to predict preferences and generate or enhance a previous profile. In one embodiment, the customer specific profile is continuously updated as new watch instances from this customer occur.

As shown, a series of desired KPI models 814, 1-N, may be fed into the ML Platform 812 as a second axis parameter to predict a KPI model that may be satisfied by a set of predicted user's upcoming content selections. In some embodiments, an output of the ML Platform 812 is a matrix of possible content choices based on matching a predicted KPI specific ad campaign to predicted user content selections. The ad system 816 may include, but is not limited to, the ad server 706, unified auction 704 and dynamic creative service 710 components previously described.

A booking ad campaign may be for a target KPI that a marketer is anticipating as the outcome by running the media. The KPI here can be (1) open app, (2) execute a first time view, (3) establish a qualified streaming session (1, 5, 15, minutes or more), (4) signup or subscribe to the service, (5) resume watching of targeted content, (6) complete watching a targeted/sponsorship program, etc.

A target Cost Per Ad (CPA) is subsequently calculated for the expected action. Depending on the KPI desired, the marketer can provide a range of pricing choices that can be used depending on the user and the target action. The pricing and the qualified action along with the propensity for the user to perform said action may play a role in determining whether this ad impression with personalized content is shown to the user.

For example, if the ad campaign is seeking users who should meet a qualified streaming session, then the marketer may assign a theme or content category taxonomy facet such as 'new this month', trending now, popular, watch next etc. Each of these categories will correspond to one or more content tiles that are selected as recommended for the user. The recommendation service that runs in the background for the target channel will offer a ranked list of content tiles specifically for this user by content category. In an alternative embodiment, a marketer may also elect to just pick 'the best content signal' that is free of any content category selection and is anticipating that the RecSys system has a top ranked content selection to offer for this user.

User profile DB 806 may provide user profile information that may be used with the Ad system 816 to provide account and profile information based on associated identifiers (IDs). Additionally, as specific ad campaigns are presented to the user, for example, as ad banners are rendered on their display device 108, the historical information may be added to the user's profile and stored in the User Profile DB 806.

In an exemplary embodiment, the recommendation system predicts the most the relevant and personalized content title for every user via an object recognition model 818. This model may be trained, in some embodiments, by supervised training data sets of identified objects paired with imagery containing these objects. For example, the system may be trained using hundreds of images showing "actor A" with a recognized object output of at least "actor A".

In some embodiments, the user's profile metadata may be considered during training of the object recognition model 818. For example, the object recognition model 818 may be trained to adjust weighting of object significance according to user's profile metadata until the model can predict a success rate (e.g., user selects dynamically generated banner) above a selected threshold. For example, if a predetermined success threshold is a 0.5% selection of the banner by the user, then the weighting of each object to extract from content asset imagery and match from the user's profile are modified until the threshold is met. For example, affinity for actors, characters, genres, themes, etc. may have their weighting adjusted until the threshold is met or is trending towards the threshold.

Figure 9:
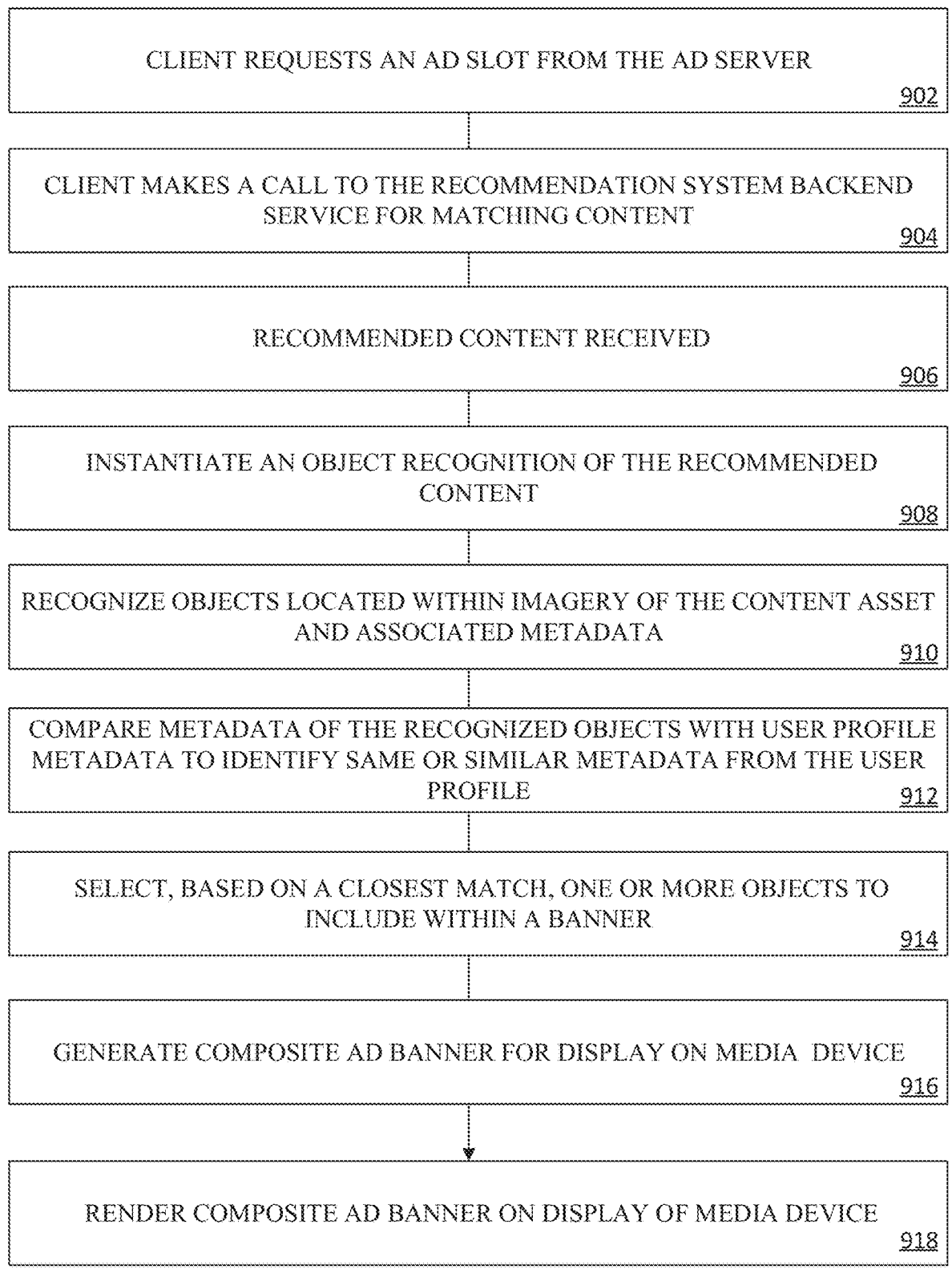
FIG. 9 illustrates a flow diagram for a personalized banner system, according to some embodiments.

FIG. 9 illustrates a flow diagram for a personalized banner system, according to some embodiments. In some embodiments, the systems described generate and render dynamic banners on streaming platforms.

In 902, a personalized banner system recognizes a request from a client (e.g., media device 106) for an ad for an ad slot which will be sent to an ad server along with user profile information. In some embodiments, the personalized banner system may be implemented by the client.

In 906, the personalized banner system receives recommended content, based on the client receiving an ad slot and further based on a client call to a recommendation system backend service 904 for the recommended content. For example, recommendation system 302, based on the user profile provides one or more content assets for the dynamic banner generator to consider for inclusion in a dynamically generated banner.

In 908, the personalized banner system instantiates an object recognition of the recommended content. For example, ML platform 812 trains and implements object recognition model 818.

In 910, the personalized banner system recognizes objects located within imagery of the content asset and associated metadata. For example, object recognition model 818 recognizes faces of actors shown within the recommended content and outputs metadata that identifies them (e.g., names or characters played).

In 912, the personalized banner system compares metadata of the recognized objects with user profile metadata to identify same or similar metadata (e.g., closest match) from the user profile. For example, a comparison of metadata identifies an affinity for a specific actor found in the imagery of the recommended content.

In 914, the personalized banner system, based on a closest match, selects one or more objects to include within a banner. For example, the imagery of the specific actor matched is extracted from the image for inclusion in a banner to dynamically select imagery for the banner to match that user's affinities to that actor.

In 916, the personalized banner system pulls in the selected one or more objects and augments the one or more objects with any of graphics, artwork, color schemes, motion, framing, composite filling, animation, content ratings, etc. The personalized banner system may further size, scale, or crop the one or more objects or other included visual aspects or the banner itself. A stitcher then 'assembles' the dynamic banner that is a fully composite banner that the client can render on a screen.

In 918, the composite ad banner is rendered on a media device display.

The solution described above marries several key technical components that are lacking in the current personalization aspect of ad-served media. It takes in marketer input in terms of desired action, price point that is appropriate for said action, performance model to select the marketing campaign, selection of content recommendation system (RecSys) powered content based off known user viewership and profile, combining the ad server response with this dynamically generated banner that is customized for the user. By doing this, the advertising may be perceived as wholly organic and native by creating a natural extension of the user experience/user interface to include ad placements for the user. The various embodiments solve the technical problem of making advertising endemic for OTT data streaming platforms. While described for a "user" throughout the descriptions, the user may be a group of similar users with one or more common profile components (e.g., metadata) without departing from the scope of the technology described herein.

EXAMPLE COMPUTER SYSTEM

Figure 10:
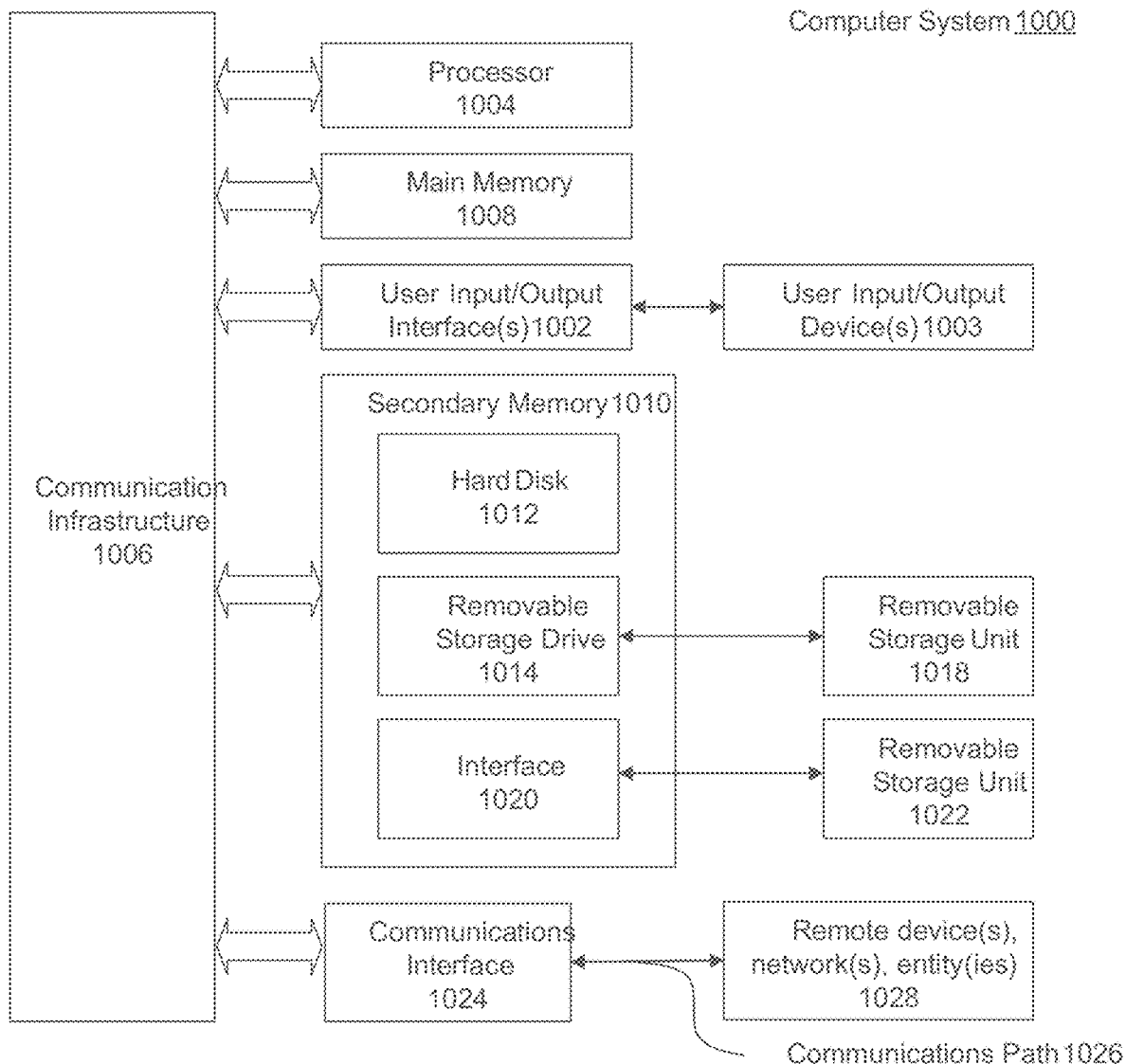
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for creating dynamic banners, the computer-implemented method comprising:
generating, by at least one computer processor, based on first metadata of a user profile, a call to a content recommendation system powering a streaming media publisher channel for first recommended content assets for a target banner, wherein the first metadata includes a user's preferences for content assets;
initiating, based on a trained machine learning model, an object recognition of one or more objects located within imagery of the first recommended content assets, wherein each object of the one or more objects includes identifying second metadata;
retrieving, based on the identifying second metadata, second recommended content assets, wherein the second recommended content assets include at least a portion of third metadata matching the identifying second metadata;
comparing the first metadata and the third metadata;
selecting, based on metadata common to the first metadata and the third metadata, at least one additional object from one or more objects of the second recommended content assets;
extracting the at least one additional object from imagery of the second recommended content assets;
stitching the at least one additional object into the target banner to form a composite banner; and
rendering the composite banner on a display of a media device.

2. The computer-implemented method of claim 1, wherein the composite banner comprises an endemic banner.

3. The computer-implemented method of claim 1, wherein the media device comprises an Over-the-Top (OTT) device.

4. The computer-implemented method of claim 1, further comprising the content recommendation system instantiating the trained machine learning model, based on the first metadata of the user profile, to generate the first recommended content assets.

5. The computer-implemented method of claim 1, wherein the trained machine learning model comprises an image recognition model.

6. The computer-implemented method of claim 5, further comprising the image recognition model being trained to recognize any of: faces, themes, genres, scenes, media series, or text within the imagery of the first recommended content assets or the second recommended content assets.

7. The computer-implemented method of claim 1, further comprising dynamically modifying one or more visual components of the composite banner.

8. The computer-implemented method of claim 7, wherein the dynamically modifying one or more visual components comprises generating one or more of: artwork, movement, animation, cinemagraphs, resizing, scaling, cropping, image framing, color changes, font changes, or composite filling.

9. The computer-implemented method of claim 1, wherein a closest match comprises one or more of: the first metadata being identical to the third metadata, or at least a portion of the first metadata being identical to the portion of the third metadata.

10. A system, comprising:
one or more memories;
at least one processor each coupled to at least one of the memories and configured to perform operations comprising:
generating, based on first metadata of a user profile, a call to a content recommendation system powering a streaming media publisher channel for first recommended content assets for a target banner, wherein the first metadata includes a user's preferences for content assets;
initiating, based on a trained machine learning model, an object recognition of one or more objects located within imagery of the first recommended content assets, wherein each object of the one or more objects includes identifying second metadata;
retrieving, based on the identifying second metadata, second recommended content assets, wherein the second recommended content assets include at least a portion of third metadata matching the identifying second metadata;
comparing the first metadata and the third metadata;
selecting, based on metadata common to the first metadata and the third metadata, at least one additional object from one or more objects of the second recommended content assets;
extracting the at least one additional object from imagery of the second recommended content assets;
stitching the at least one additional object into the target banner to form a composite banner; and
rendering the composite banner on a display of a media device.

11. The system of claim 10, where the composite banner comprises an endemic banner.

12. The system of claim 10, where the system comprises a streaming media device platform for an Over-the-Top (OTT) device.

13. The system of claim 10, the operations further comprising instantiating the trained machine learning model, based on the first metadata of the user profile, to generate the first recommended content assets.

14. The system of claim 10, wherein the trained machine learning model comprises an image recognition model.

15. The system of claim 14, the operations further comprising training the image recognition model to recognize any of: faces of actors, characters, or text within the imagery of the first recommended content assets or the second recommended content assets.

16. The system of claim 14, the operations further comprising training the image recognition model to recognize any of: themes, genres, scenes, or a media series within the imagery of the first recommended content assets or the second recommended content assets.

17. The system of claim 10, the operations further comprising dynamically modifying one or more visual components of the composite banner by generating one or more of: artwork, movement, animation, cinemagraphs, resizing, scaling, cropping, image framing, color changes, font changes, or composite filling.

18. A non-transitory computer-readable medium having instructions stored thereon that, when executed by at least one computing device, cause the at least one computing device to perform operations comprising:
 generating, based on first metadata of a user profile, a call to a content recommendation system powering a streaming media publisher channel for first recommended content assets for a target banner, wherein the first metadata includes a user's preferences for content assets;
 initiating, based on a trained machine learning model, an object recognition of one or more objects located within imagery of the first recommended content assets, wherein each object of the one or more objects includes identifying second metadata;
 retrieving, based on the identifying second metadata, second recommended content assets, wherein the second recommended content assets include at least a portion of third metadata matching the identifying second metadata;
 comparing the first metadata and the third metadata;
 selecting, based on metadata common to the first metadata and the third metadata, at least one additional object from one or more objects of the second recommended content assets;
 extracting the at least one additional object from imagery of the second recommended content assets;
 stitching the at least one additional object into the target banner to form a composite banner; and
 rendering the composite banner on a display of a media device.

19. The non-transitory computer-readable medium of claim 18, the operations further comprising dynamically modifying one or more visual components of the composite banner by generating one or more of: artwork, movement, animation, cinemagraphs, resizing, scaling, cropping, image framing, color changes, font changes, or composite filling.

20. The non-transitory computer-readable medium of claim 18, the operations further comprising the content recommendation system instantiating the trained machine learning model, based on the first metadata of the user profile, to generate the first recommended content assets.

\* \* \* \* \*